United States Patent
Ghani et al.

(10) Patent No.: US 12,282,912 B2
(45) Date of Patent: Apr. 22, 2025

(54) SYSTEM AND METHOD FOR EPHEMERAL COMPUTE WITH PAYMENT CARD PROCESSING

(71) Applicant: Aven Holdings, Inc., Burlingame, CA (US)

(72) Inventors: Usman Ghani, Burlingame, CA (US); Almaz Nanjappa, Burlingame, CA (US); Sadi Khan, Burlingame, CA (US)

(73) Assignee: Aven Holdings, Inc., Burlingame, CA (US)

( * ) Notice: Subject to any disclaimer, the term of this patent is extended or adjusted under 35 U.S.C. 154(b) by 0 days.

(21) Appl. No.: 17/469,207

(22) Filed: Sep. 8, 2021

(65) Prior Publication Data

US 2022/0076240 A1    Mar. 10, 2022

Related U.S. Application Data

(60) Provisional application No. 63/076,220, filed on Sep. 9, 2020.

(51) Int. Cl.
*G06Q 20/34*     (2012.01)
*G06Q 20/38*     (2012.01)
*G06Q 20/40*     (2012.01)

(52) U.S. Cl.
CPC ..... *G06Q 20/353* (2013.01); *G06Q 20/38215* (2013.01); *G06Q 20/3825* (2013.01); *G06Q 20/4014* (2013.01)

(58) Field of Classification Search
None
See application file for complete search history.

(56) References Cited

U.S. PATENT DOCUMENTS 10,235,672 B2 * 3/2019 Neuwirth ............... G06Q 20/12
11,082,283 B2 * 8/2021 Trim ....................... H04L 43/08
(Continued)

FOREIGN PATENT DOCUMENTS

EP    2088544 A1 *  8/2009  ....... G06F 17/30893
EP    3467741 A1 *  4/2019  ........... G06Q 20/208

OTHER PUBLICATIONS

Elhag, H. M., "Enhancing Online Banking Transaction Authentication by Using Tamper Proof & Cloud Computing", University of Surrey, ProQuest Dissertations & Theses. (Year: 2015).*

(Continued)

*Primary Examiner* — Clay C Lee
(74) *Attorney, Agent, or Firm* — Goodwin Procter LLP

(57) ABSTRACT

Technology is described for payment card processing using ephemeral compute. An example system comprises a client application, an ephemeral compute instance, and a payment service. The client application is configured to send a request for transmitting sensitive information associated with a payment card to the ephemeral compute instance. The ephemeral compute instance is triggered to transmit the sensitive information to the payment service in response to receiving the request and is configured to shut down after the transmission of the sensitive information to the payment service. The payment service is configured to authorize a transaction based on the received sensitive information transmitted by the ephemeral compute instance.

18 Claims, 5 Drawing Sheets

(56) References Cited

U.S. PATENT DOCUMENTS

| | | | |
|---|---|---|---|
| 2011/0208659 A1* | 8/2011 | Easterly | G06Q 20/3274 |
| | | | 705/79 |
| 2012/0089481 A1* | 4/2012 | Iozzia | H04N 7/16 |
| | | | 726/5 |
| 2014/0207736 A1* | 7/2014 | Susanto | G06F 16/27 |
| | | | 707/634 |
| 2017/0279826 A1 | 9/2017 | Mohanty et al. | |
| 2018/0191735 A1 | 7/2018 | Lahoz et al. | |
| 2020/0013037 A1* | 1/2020 | Benkreira | G06Q 20/405 |
| 2020/0202321 A1 | 6/2020 | Nitsch et al. | |
| 2020/0295948 A1* | 9/2020 | Hatti | G06Q 20/3274 |
| | | | 705/79 |
| 2021/0233045 A1* | 7/2021 | Singh | G06Q 20/12 |
| 2023/0119385 A1* | 4/2023 | Fenichel | H04L 63/0853 |
| | | | 726/6 |

OTHER PUBLICATIONS

International Preliminary Report on Patentability for International Patent No. PCT/US2021/049378, dated Mar. 7, 2023 (5 pages).
Atiewi Saleh et al.: "Scalable and Secure Big Data IoT System Based on Multifactor Authentication and Lightweight Cryptography", IEEE Access, IEEE, USA vol. 8, Jun. 15, 2020 (2020-06-15) Abstract.
Extended European Search Report for European Patent No. 21867485. 1, dated Jul. 8, 2024 (12 pages).

* cited by examiner

SYSTEM AND METHOD FOR EPHEMERAL COMPUTE WITH PAYMENT CARD PROCESSING

CROSS-REFERENCE TO RELATED APPLICATION

This application claims the benefit of priority to U.S. Provisional Application No. 63/076,220, filed on Sep. 9, 2020, entitled "System and Method for Ephemeral Compute with Payment Card Processing," which is hereby incorporated by reference in its entirety.

TECHNICAL FIELD

People are becoming increasingly dependent on payment cards (e.g., credit cards, debit cards) to make purchases and other transactions. Authorizing a transaction between a vendor/client terminal and a remote payment processor/server requires the sending of sensitive information contained in payment cards through the internet. Transmission of sensitive information through the internet requires a certain level of security to prevent the leaking of the sensitive information associated with the payment cards.

BRIEF DESCRIPTION OF THE DRAWINGS

The advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
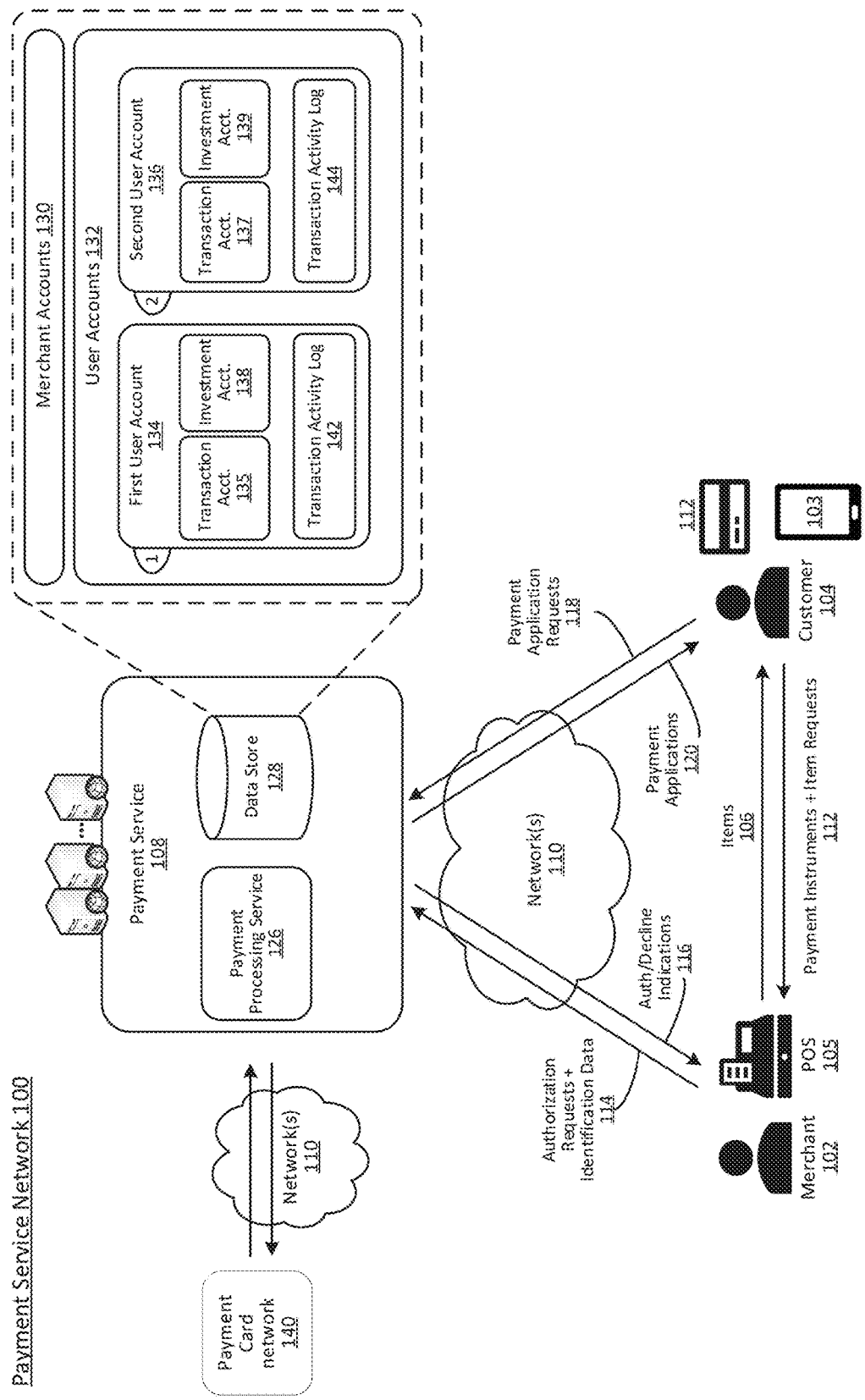
FIG. 1 illustrates a payment service network according to one example as described herein.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

During the course of business, vendors of goods and services accept and transmit credit and debit card information (number, expiration date, Card Verification Value (CVV), etc.) from customers. The Payment Card Industry Data Security Standard (PCI DSS) is a set of security standards that apply to any company involved with the transmission or storage of payment card information. The PCI DSS applies to companies of any size that accept credit card or debit card payments. If a company intends to accept card payment, and store, process, and transmit cardholder data, the company needs to meet certain security criteria that are defined by an independent body, i.e., PCI Security Standards Council (PCI SSC), which was originally formed by American Express, Discover Financial Services, JCB International, MasterCard, and Visa Inc. It should be understood that it is the payment brands and acquirers, rather than the PCI SSC, that are generally responsible for enforcing compliance.

The PCI DSS covers certain high-level areas for security purposes, which includes, but is not limited to:
1. Install and maintain a firewall configuration to protect cardholder data.
2. Do not use vendor-supplied defaults for system passwords and other security parameters.
3. Protect stored cardholder data.
4. Encrypt transmission of cardholder data across open, public networks.
5. Protect all systems against malware and regularly update anti-virus software or programs.
6. Develop and maintain secure systems and applications.
7. Restrict access to cardholder data by business need to know.
8. Identify and authenticate access to system components.
9. Restrict physical access to cardholder data.
10. Track and monitor all access to network resources and cardholder data.
11. Regularly test security systems and processes.
12. Maintain a policy that addresses information security for all personnel.

PCI standards enforce requirements around the security of the servers hosting the code that process or transmit the customer's payment card information. These requirements include hardened network configuration, firewalling, enforcement of routing and network rules, malware scanning of the servers, constant upgrades, and security patch management. This puts a significant burden on engineering teams supporting the businesses accepting payment cards. There is a need for improved systems that place less burden on the businesses accepting payment cards.

Approaches in accordance with some implementations make it possible to reduce or remove the burden associated with most of the above requirements for the businesses accepting credit card payments. The present method and system accomplish this by using an ephemeral compute service in a private virtual cloud environment, which acts as a proxy but does not store any cardholder data. Briefly, in a cloud computing space, instead of running workloads (e.g., the transmission of credentials associated with payment card information) on persistent virtual servers, with ephemeral compute, a cloud provider instead runs the workload when there is a compute task to complete (e.g., the transmission of credentials), and then shuts the ephemeral compute down when the compute task finishes. An example of that is when an Application Programming Interface (API) server is created for each request, it serves the request and then gets shut down. All of these steps may be done behind the firewall of a cloud provider and all requests for transmission of cardholder data are managed and routed through the cloud provider's infrastructure without storing any payment card data in its database, thereby reducing the risk levels for PCI compliance.

Advantageously, as described above, the technology described herein solves an information exposure problem of payment cards by employing multiple-level of security strategies. In addition, by implementing ephemeral compute, the developers associated with payment card transmission do not need to manage any virtual machines or containers. Instead, execute code is uploaded to a cloud provider, where the execute code is invoked on-demand by commandeering the computing resources when required and then releasing the computing resources upon completion. This then reduces the burden of having to maintain the virtual machines or containers and having to constantly secure and update them by the developers of the businesses accepting the payment cards.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "may," "can," "could," or "might" be included or have a characteristic, that particular component or feature is not required to be included or have the characteristic.

The term "module" refers broadly to software stored on a non-transitory storage medium (e.g., volatile or non-volatile memory for a computing device), hardware, or firmware (or any combination thereof) modules. Modules are typically functional such that they may generate useful data or other output using specified input(s). A module may or may not be self-contained. An application program (also called an "application") may include one or more modules, or a module may include one or more application programs.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 illustrates a payment service network 100 in accordance with one example implementation. According to one example, payment service network 100 includes merchant 102 that conducts transactions with customer 104 (or user 104) for items 106 (e.g., goods or services) offered by the merchant 102. The payment service network 100 includes a payment service system 108 (also referred to as "payment service" or "PSS") coupled to a merchant point of sale (POS) device 105 and customer device 103 via a network 110, to authorize payment instruments of customer 104. Customer 104 may engage in transactions with merchant 102 to obtain items 106. Customer 104 may provide, as shown at 112, payment instruments to merchant 102 along with requests for items 106 offered by merchant 102. In some implementations, an ephemeral compute-based sensitive information transmission system (not shown) may be included in the payment service network 100 for transmitting the sensitive information from the POS device 105 or customer device 103 to the payment service system 108, as further described in detail in FIGS. 3-5.

In various examples, the payment service system 108 may be or include an online platform for processing payments 126 as described herein. The payment service system 108 or online platform may utilize or include one or more server computers, which may be referred to herein as platform servers or payment servers.

Merchant 102 may utilize POS device 105 for accepting payment from customer 104. POS device 105 may be any mobile or non-mobile device that includes instances of a POS application that executes on the POS device 105. The instances of the POS application may be or include a downloadable application provided by the payment service system 108, or embedded software running on an all-in-one POS device provided by the payment service system 108. POS device 105 may further include a wireless communication module with wireless communication capabilities (e.g., NFC, Bluetooth, cellular data, etc.), allowing wireless communication between POS device 105 and other devices with wireless communication capabilities. For example, POS device 105 may have an NFC-enabled chip that communicates with other NFC-enabled devices. The POS application may be provided by the payment service 108 and provide POS functionality to POS device 105 to enable merchant 102 (e.g., a business or owners, employees, or agents of the business) to accept payments from customer 104. In some types of businesses, POS device 105 may correspond to a store, restaurant, website, or other places of business of the merchant, and thus, may be a fixed location that typically does not change on a day-to-day basis, or may correspond to an Internet commerce site. In other types of businesses, however, the location of POS device 105 may change from time to time, such when the merchant operates a food truck, is a street vendor, is a cab driver, etc., or has an otherwise mobile business, e.g., in the case of a merchant who sells goods or services at buyers' homes, places of business, and so forth.

As used herein, a merchant may include any business engaged in the offering of goods or services for acquisition by customers. Actions attributed to a merchant may include actions performed by owners, employees, website servers, or other agents of the merchant, and thus no distinction is made herein unless specifically discussed. In addition, as used herein, the customer 104 may include any entity that acquires goods or services from a merchant, such as by purchasing, renting, leasing, borrowing, licensing, or the like. Hereinafter, goods and/or services offered by merchants may be referred to as items, e.g., item 106. Thus, a merchant and a customer may interact with each other to conduct a transaction in which the customer acquires item 106 from merchant 102, and in return, customer 104 provides payment 112 to merchant 102.

As used herein, a transaction may include a financial transaction conducted between customer 104 and merchant 102. For example, when paying for a transaction, customer 104 may provide the amount that is due to the merchant using cash or other payment instruments 112 (e.g., a debit card, a credit card, a stored-value gift card, a check, through an electronic payment application on device 103 carried by the customer, or the like). The merchant may interact with POS device 105 to process the transactions, such as by inputting (e.g., manually, via a magnetic card reader, NFC reader, or an RFID reader, etc.) identifiers associated with payment instrument 112. For example, a payment instrument of the customer may include a card having one or more magnetic strips for providing card and customer information when swiped in a card reader. In other examples, other types of payment instruments may be used, such as smart cards having a built-in memory chip that is read by the device when the card is inserted into the reader, such as chips that comply with the Europay, MasterCard, and/or Visa (EMV) standard (e.g., EMV cards). In other examples, other types of payment instruments include cards or computing devices that communicate via radiofrequencies such as radio frequency identification (RFID) tags, near field communication (NFC) devices, etc.

During the transaction, POS device 105 may determine transaction information describing the transaction, such as an identifier of the payment instrument (e.g., payment card number, account credentials, or other payment device identifier), an amount of payment received from the customer, the item(s) acquired by the customer, a time, location (e.g., street address, GPS coordinates, IP address, etc.) and date of the transaction, a payment card network 140 associated with the payment instrument, an issuing bank of the payment instrument, a name or user account of the customer, contact information of the customer, type of currency, IP address of POS device 105, IP address of customer device 103, and so forth. POS device 105 may send the transaction information to payment service 108 over network 110 (e.g., including the Internet), either substantially contemporaneously with the conducting of the transaction (in the case of online transactions) or later when POS device 105 is in the online mode (in the case offline transactions).

In an offline transaction, POS device 105 may store information related to the transaction, including, but not limited to, a cost of the transaction, a time of day at which the transaction occurred, a day of the week at which the transaction occurred, a location at which the transaction took place, an item that the customer obtained, identity and/or contact information of the customer, and a payment instrument used in the transaction. After conducting an offline transaction with customer 104, POS device 105 may provide at least a subset of the stored information to the payment service 108 over the network 110. Network 110 may represent or include any one or more wired or wireless networks, such as a Wi-Fi network, a cellular network, the Internet, or the like. In an online transaction, POS device 105 may send this information to payment service 108 over network 110 substantially contemporaneously with the transaction with the customer 104.

After merchant 102 receives the payment information from customer 104, merchant 102 may send respective authorization requests, along with information related to the respective transactions, to payment service 108, as illustrated at 114. Payment service 108 may include payment processing service 126 and data store 128 that stores merchant accounts 130 and user accounts 132, as well as the transaction histories of merchants and users.

The payment processing service 126 may function to receive the information regarding a transaction from POS device 105 of merchant 102 and attempt to authorize the payment instrument 112 used to conduct the transaction. Payment processing service 126 may then send an indication of whether the payment instrument has been approved or declined back to POS device 105, as illustrated at 116.

Generally, when a customer 104 and a merchant 102 enter into an electronic payment transaction, the transaction is processed by electronically transferring funds from a financial account associated with the customer 104 to a financial account associated with the merchant 102. As such, the payment processing service 126 may communicate with one or more computing devices of a payment card network 140 (e.g., MasterCard® or VISA®) over network(s) 110 to conduct financial transactions electronically. Payment processing service 126 may also communicate with one or more computing devices of one or more banks, processing/acquiring services, or the like over the network 110. For example, payment processing service 126 may communicate with an acquiring bank, an issuing bank, and/or a bank maintaining user accounts for electronic payments. Payment processing service 126 may also communicate with, or access user and merchant accounts maintained by payment service 108. In some examples, the payment processing service 126 may communicate with one or more entities that perform or manage securities transactions and/or cryptocurrency transactions.

An acquiring bank may be a registered member of a card association (e.g., Visa® or MasterCard®) and/or may be part of a payment card network 140. An issuing bank may issue credit cards to buyers (e.g., customer 104) and may pay to acquire banks for purchases made by cardholders (e.g., customer 104) to which the issuing bank has issued a payment card. Accordingly, in some examples, the computing device(s) of an acquiring bank may be included in the payment card network and may communicate with the computing devices of a card-issuing bank to obtain payment. Further, in some examples, the customer 104 may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

While FIG. 1 illustrates merchants 102 sending the transaction data directly to the payment service 108 as part of the request to authorize the payment instrument 112, in some instances, other entities (e.g., banks associated with the merchant 102 or with customer payment instruments 112) may provide transaction data, such as part of a batched, periodic process.

According to one example, data store 128 may be used to store merchant accounts 130 and user accounts 132, among other data. User accounts 132 may store records of user accounts associated with each user of payment service 108. For example, user accounts 132 may include a first user account 134 and a second user account 136. Each of the accounts of user accounts 132 may include information related to the respective balance and transaction history associated with each user account. Each of the user accounts 132 may include one or more balances associated with a payment service and further include access to external bank accounts. For example, first user account 134 includes transaction account 135 and investment account 138, and second user account 136 includes transaction account 137 and investment account 139. According to one example, transaction accounts 135 and 137 may include stored balances maintained by payment service 108 on behalf of its users. Investment accounts 138 and 139 may be used by users to save a stored balance towards a particular goal or otherwise to allow payment service 108 to maintain an investment on behalf of its users. Each user account 134 and 136 of user accounts 132 may also include a loan account representing funds that are loaned to the user by the payment service 108. Each user account 134 and 136 of user accounts 132 may further include access to external payment card networks (e.g., payment card network 140) to facilitate transactions with credit cards, debit cards, and the like.

Furthermore, the transaction history for each user account may be stored using an individual log for each user account. For example, first user account 134 includes transaction activity log 142 and second user account 136 includes transaction activity log 144. Transaction activity logs 142 and 144 may be used to store transaction history for each respective user account, including debits and credits made to the balances thereof. Similarly, transaction history for merchants may be stored in merchant accounts 130 using an individual log for each merchant.

According to one example, each of the user accounts 132 may include stored values of multiple currencies, such as fiat currency, cryptocurrency, equity value, or other monetary value represented by digital assets. Each of the currencies may be stored directly in each account of user accounts 132. Each of the user accounts 132 may further include access to external accounts that facilitate such currencies (e.g., third-party cryptocurrency exchanges/wallets, equity holding accounts, etc.).

According to one example, merchant accounts 130 may store information associated with respective ones of the merchants 102. For instance, the merchant accounts 130 may indicate a class of items offered by respective merchants (e.g., coffee items, collectibles, apparel, etc.), a type of business of the merchant (e.g., restaurant, coffee shop, retail store, etc.), a geographical location of the merchant, and the like.

In some instances, a computing device associated with the merchant (e.g., POS device 105, servers of the merchant, etc.) determines when the customer visits physical premises or a digital presence of the merchant. For instance, the device 103 of the customer 104 may include an application (e.g., an application provided by payment service 108) that communicates with POS device 105 of merchant 102 via near-field communication protocols (e.g., NFC, Bluetooth, etc.). Therefore, when the customer visits the physical premises of merchant 102, for example, POS device 105 may detect the presence of customer device 103. The POS device 105 may accordingly determine that the customer 104 is present. In another example, one or both of POS device 105 and customer device 103 may share its location (e.g., GPS coordinates) to a common service for determining when customer device 103 and POS device 105 are located within a proximity threshold of one another, and for mediating a transaction between customer device 103 and POS device 105.

In another example, customer 104 may utilize customer device 103 to check-in at the merchant location, and POS device 105 may receive an indication of this check-in. When the customer visits a digital presence of merchant 102 (e.g., mobile app, website, etc.), customer 104 may log in or otherwise provide information (e.g., a cookie on the device 103) from which the merchant 102 determines that the customer 104 is at the merchant location. Of course, while a few examples are listed, it is to be appreciated that the merchant 102 and/or payment service 108 may determine when the customer 104 is present at the merchant location in any other number of ways. In each instance, after payment service 108 receives an indication that customer 104 is co-located with merchant 102, the payment service 108 may determine whether to send one or more previously expressed item preferences of the customer 104 to the merchant 102.

In addition, customer 104 may desire to receive an instance of a payment application, such as a mobile wallet application, from the payment service 108. FIG. 1 illustrates that the customer 104 may send payment-application requests 118 to payment service 108. In response, payment service 108 may provide instances of the application 120 back to customer device 103. In addition, payment service 108 may map an identification of the instance of the application 120 to the user accounts 132.

Figure 2:
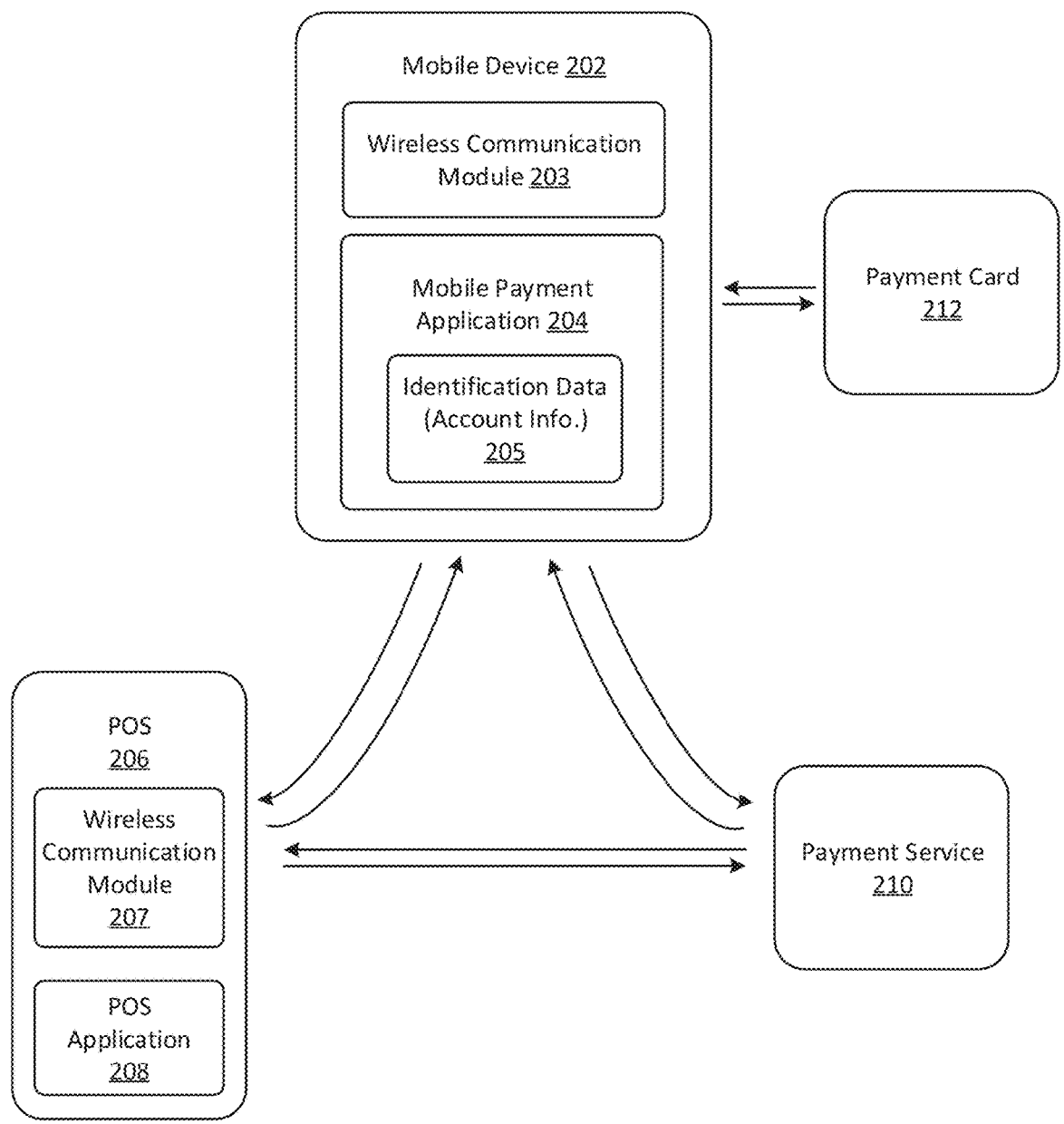
FIG. 2 illustrates a mobile device and payment application according to one example as described herein.

FIG. 2 illustrates a mobile device and payment application 200 in accordance with one example implementation. Mobile device 202 and POS device 206 may be computing devices with wireless communication modules 203 and 207, respectively, with wireless communication capabilities (e.g., NFC, Bluetooth, cellular data, etc.), allowing wireless communication therebetween. A payment application 204 is a payment application provided by the payment service 210 and executes on a user's mobile device 202. POS device 206 may include a Point of Sale (POS) application 208 that is associated with one or more merchant systems and may be used by the customer to purchase products or services. The payment application 204 and POS application 208 may also be a website provided by payment service 210 (e.g., payment service 108), or any source website or application that provides a portal to send and accept payments for transactions using payment service 210. Applications 204 and 208 may be accessible through a web browser (e.g., Chrome® or Safari®) on the mobile device 202, according to one example. In another example, applications 204 and 208 may be software applications downloadable via an application store (e.g., Google Play Store®, Apple App Store®, etc.). Once accessed or registered into the applications 204 and 208, the web browser or application may remember the credentials (e.g., identification data 205) for subsequent visits (for example, through web browser authentication, web cookies, web history, etc.), allowing access to the applications without logging-in to an account again. The description herein is with reference to the payment application 204 and POS application 208 as installed applications; however, it will be understood that these applications as authenticated or unauthenticated applications on a web browser is within the meaning of the term. In various examples, the mobile device 202, the POS device 206, and/or the payment service 210 may be the same as or may include the customer device 103, the POS device 105, and/or the payment service 108, respectively.

Payment application 204 may include an electronic wallet application, money transfer application (e.g., application for sending and receiving money via email or phone), or any other application having stored therein identification data 205 linked to user accounts of payment service 210 or other data linked to one or more payment cards and/or bank accounts, both of which may be used by the owner of the mobile device to initiate transactions. Such transactions may include traditional purchase transactions between customers and merchants or service providers, person-to-person transactions, and the like.

Payment application 204 may also be used to manage internal payment cards (i.e., virtual payment cards issued by payment service 108 to users having a user account 132). As such, options with respect to internal payment cards may be adjusted and managed using payment application 204. For example, when a user account of user accounts 132 includes multiple payment methods (e.g., credit card, bank account, loan account, etc.), payment application 204 may set one of those payment methods to be the default method for debits or credits when using an internal payment card. For example, the mobile payment application 204 may communicate with a physical payment card 212 using Bluetooth, NFC, or other wireless communication protocol via onboard electronics embedded within a structure of the payment card 212.

Collectively, all tools for offering payment are herein referred to as payment instruments. For example, payment instruments may refer to mobile device 202 running payment application 204, internal payment cards, external payment cards, NFC-enabled payment cards, etc. The use of the term payment instrument does not imply a mechanism of use. For example, mobile device 202 may be utilized via NFC protocols (e.g., NFC Data Exchange Format (NDEF), NFC tags, etc.), or via use of software on mobile device 202 to send messages through web forms, applications, APIs, or messaging applications. As an additional example, payment cards, whether internal (e.g., virtual cards) or external (e.g., physical cards), may be presented to a merchant to be read, or a card number may be entered into a terminal under the control of the merchant or under the control of the customer. A payment instrument may include multiple payment instruments, such as when utilizing mobile device 202 to enter a payment card number. Throughout this description, specific payment instruments may be discussed, however, the specific payment instruments should not be considered limiting, and persons of ordinary skill in the art will appreciate instances in which a payment instrument such as a payment card may be substituted for another payment instrument such as a mobile device, and vice versa.

Collectively, certain sensitive information such as credentials and other cardholder data collected during the transactions are herein referred to as PCI information. For example, an identifier of the payment instrument (e.g., payment card number, account credentials, or other payment device identifier), a payment card network associated with the payment instrument, an issuing bank of the payment instrument, a name or user account of the customer, contact information of the customer, IP address of customer device, etc., may be considered as cardholder data and thus are categorized as PCI information. Per PCI DSS standards, the transmission of PCI information requires a certain level of security. For parties that are responsible (e.g., merchant 102) for transmission of PCI information, this then requires certain security strategies and/or systems to be implemented during the transmission.

Approaches in accordance with various implementations of the present disclosure enable secure PCI transmission using ephemeral compute in a virtual private cloud environment, which implements multi-level security strategies, so that PCI DSS standards may be followed. The virtual private cloud environment does not necessarily to be developed and/or maintained by the parties that initiate the PCI information transmission but may be any virtual private cloud provider accessible from the internet. Secure PCI information transmission as discussed herein may be implemented on-demand, using ephemeral compute instances within one or more private virtual clouds for executing the secure transmission. These ephemeral compute instances may be preconfigured with certain software and may be provided using existing compute capacity assigned to a customer by a virtual cloud provider, among other such options. When a request for transmission is received, such as in the form of an application programming interface (API) call, an ephemeral compute instance may be invoked that is configured to execute the secure PCI information transmission function. The PCI information transmission function may be an on-demand, ephemeral function, for example, that may take in context and generate the appropriate functionality inline. The utilization of ephemeral compute capacity with the function provides the benefit that the functionality may be provided on-demand, and then discarded after use without storing any PCI information. Various other functions may be also implemented within the disclosed PCI information transmission system.

Figure 3:
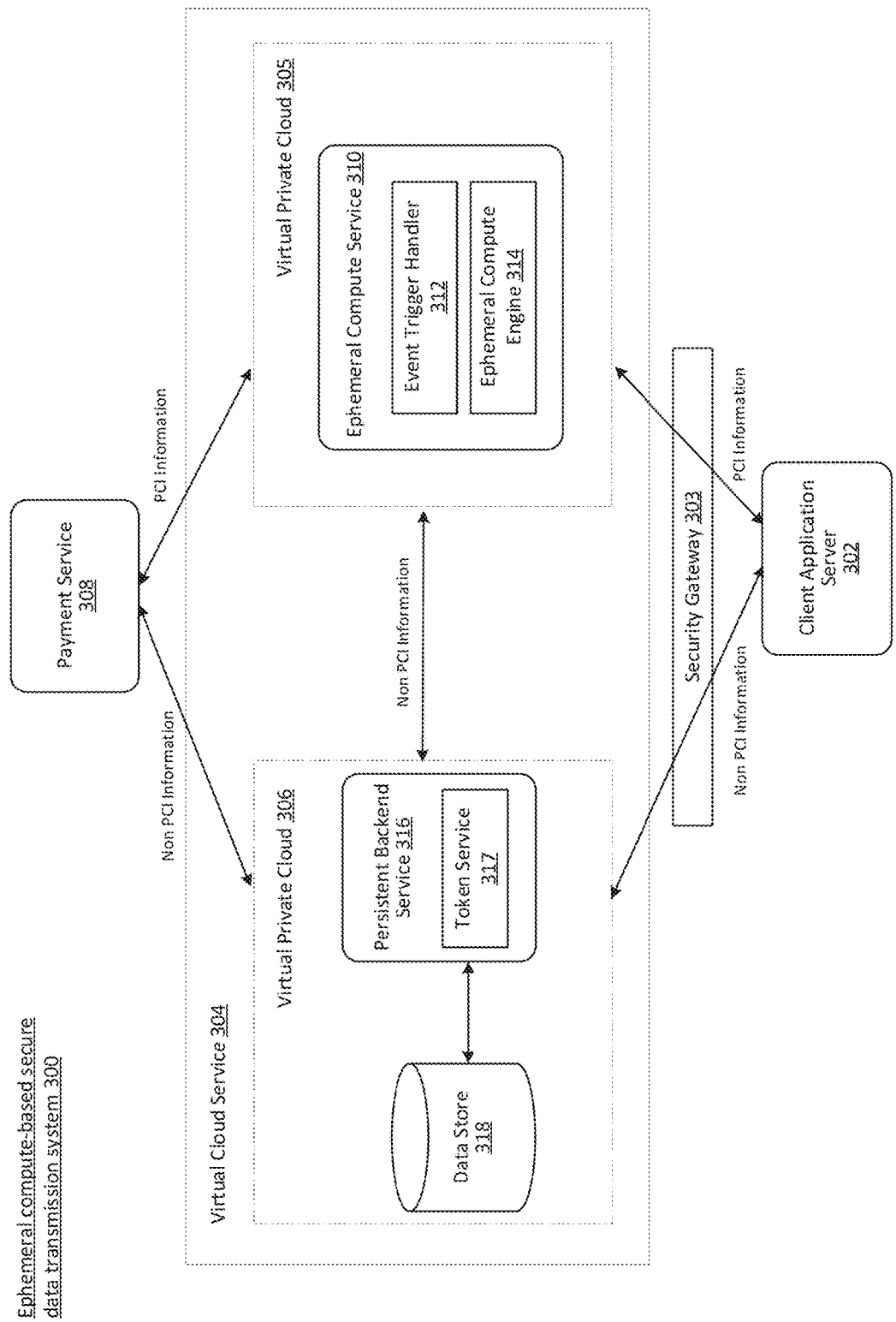
FIG. 3 illustrates an ephemeral compute-based secure data transmission system according to one example as described herein.

FIG. 3 illustrates an ephemeral compute-based secure data transmission system 300 in accordance with one example implementation. In this example, an entity, e.g., a merchant 102 or a customer 104, is able to utilize a client application server 302 (e.g., through POS 105 or customer device 103 (not shown in FIG. 3)) to submit a request across at least one network (e.g., through security gateway 303) to a resource provider environment, e.g., a virtual cloud service 304 protected by a firewall. The client application server 302 may include any appropriate electronic device operable to send and receive requests, messages, or other such information over an appropriate network and convey information back to a client device associated with the entity. Examples of such client application servers may include a POS device 105 and a customer device 103, or a server or a set of servers accessible by the POS device 105 and the customer device 103. The at least one network may include any appropriate network, including an intranet, the Internet, a cellular network, a local area network (LAN), or any other such network or combination, and communication over the network may be enabled via wired and/or wireless connections. The virtual cloud service 304 may include any appropriate components for receiving requests and handling the requests by invoking a PCI information transmission process through ephemeral compute, e.g., through ephemeral compute service 310 provided by the virtual cloud service 304. The PCI transmission process includes the transmission of PCI information from the client application server 302 to a payment service 308. The payment service 308 may authorize or reject a transaction based on the received PCI information as well as non-PCI information received through persistent backend service 316, also located within the virtual cloud service 304. Following the decision from the payment service 308, in various implementations, the virtual cloud service 304 may return the decisions made by the payment service 308 to the client application server 302 in response to the requests. The returned information may contain non-PCI information, which may thus be transmitted without going through ephemeral compute, e.g., by using persistent backend service 316 in the virtual private cloud 304. The client application server 302 may approve or reject the transaction associated with the request based on the returned information.

In various implementations, the virtual cloud service 304 may include various types of resources that may be utilized by multiple users for a variety of different purposes. In at least some implementations, all or a portion of a given resource or set of resources might be allocated to a particular entity or allocated for a particular task, for at least a determined period of time. The sharing of these multi-tenant resources from a provider environment is often referred to as resource sharing, Web services, or "cloud computing," among other such terms and depending upon the specific environment and/or implementation. In this example, the virtual cloud service 304 includes a plurality of resources of one or more types. These types may include, for example, application servers operable to implement compute code provided by a user or provider. For example, virtual private cloud instance 305 may be included in the virtual cloud service environment 304 to provide ephemeral compute service 310 in PCI information transmission. For another example, a virtual private cloud instance 306 may be included in the virtual cloud service environment 304 to provide persistent backend service 316 in processing non-PCI information-related activities in payment card processing.

In at least some implementations, an entity (e.g., customer 104 or merchant 102) wanting to utilize a portion of the virtual cloud service 304 may submit a request from the client application server 302. For example, the client application server 302 may include a client application configured to request a form to capture the sensitive credit card or debit card information at the beginning of a transaction. The client application server 302 may send a form resource request to the virtual cloud service 304 through a Hypertext Transfer Protocol Secure (HTTPS) protocol. In some implementations, when making the HTTPS request, the client application server 302 may also provide a JSON Web Token (JWT) access token to the client virtual service 304, e.g., to a Lambda Get Form function if AWS Lambda® is used. The JWT access token may be an authorization token previously issued by the persistent backend server 306, e.g., sometime before the transaction is initiated. The authorization token once generated may remain unchanged for the associated entity in different transactions. For instance, an authorization token for a POS 105 or a customer device 103 remains unchanged once generated.

In some implementations, the persistent backend service 316 may implement or be provided with access to a token service 317 and/or an associated data store 318. Token service 317 may be used to generate, process, and maintain tokens, which are substitute identifiers for account identifiers. During a transaction, instead of using a real account identifier (e.g., a primary account number (PAN)) to identify the account of the user, a token may be used instead to identify the account. By using a token as a substitute for an account identifier, the risk of comprising real account information may be mitigated. In some implementations, a token may have its own set of use restrictions, and token service may manage the deployment and usage of the tokens according to their use restrictions. In some implementations, token service 317 may be in communication with data store 318 where the generated tokens are stored. Specifically, data store 318 may maintain a mapping between a token and the real account identifier (e.g., PAN) represented by the token and associated with a specific entity.

In some implementations, the authorization token issued by the persistent backend service 316 may allow the virtual cloud service 304, e.g., through its Lambda or other similar function, to validate the entity requesting the form to capture the payment card information. If the token is validated, the form resource document for capturing the payment card information may be issued to the client application server 302 and presented to the entity associated with the client application server, so that the payment card information can be subsequently captured inside the form resource document.

In some implementations, the form source document issued to the client application server 302 may be rendered within an IFrame. IFrame is a HyperText Markup Language (HTML) document embedded inside another HTML document. The IFrame HTML element is often used to insert content from another source. For online businesses that collect, store, or transfer sensitive data, especially information that falls under the scope of compliance for PCI DSS, General Data Protection Regulation (GDPR), or Consumer Privacy Act (CCPA) requirements, IFrames are a powerful security tool. For instance, by rendering the form source document issued to the client application server within an IFrame, it prevents access of the data with the IFrame while allowing the form source document to safely capture user PAN details. IFrame can thus offer an extra layer of protection when it comes to secure a customer's sensitive data.

In some implementations, once the payment card information is captured by the form source document within an IFrame, the payment card information may be submitted to the virtual cloud service 304 for transmission to the payment service 308. As previously described, the payment card information may be submitted as an HTTPS POST request.

In some implementations, the HTTPS POST request for submitting credit card information may communicate through a security gateway 303 coupled to the virtual cloud service 304 and the client application server 302. The security gateway 303 may include application programming interfaces (APIs) or other exposed interfaces enabling a user to submit requests to the virtual cloud service 304. The security gateway 303 may also include other components as well, such as at least one Web server, routing components, load balancers, and the like. In one example, the security gateway is an API Gateway, which is "middleware" that makes available backend services to mobile, web, and other external clients via a set of protocols and commonly through a set of RESTful application programming interfaces (APIs). An API Gateway makes it much simpler to develop, secure, manage, and scale endpoints by moving most of the required logic from the client, into the gateway.

In some implementations, the security gateway 303 may determine whether to grant access to the specific PCI information transmission function of the virtual cloud service, e.g., the vertical cloud service 310. To achieve this, information from the request may be parsed to identify the entity submitting the request, so as to determine whether that entity has an existing account associated with the ephemeral cloud service 310. The entity may provide any of various types of credentials in order to authenticate an identity of the entity to the gateway 303. These credentials may include, for example, a username and password pair, biometric data, a digital signature, or other such information. The security gateway 303 may validate this information against information stored for the entity. If the entity has an account with the appropriate permissions, the security gateway 303 may determine whether there are adequate resources available to suit the entity's request and if so may grant access to the corresponding portion of those resources for use by the entity for an amount specified by the request. If the entity does not have a valid account with the ephemeral cloud service 310, the user account is then denied access to the type of resources specified in the request.

Figure 4:
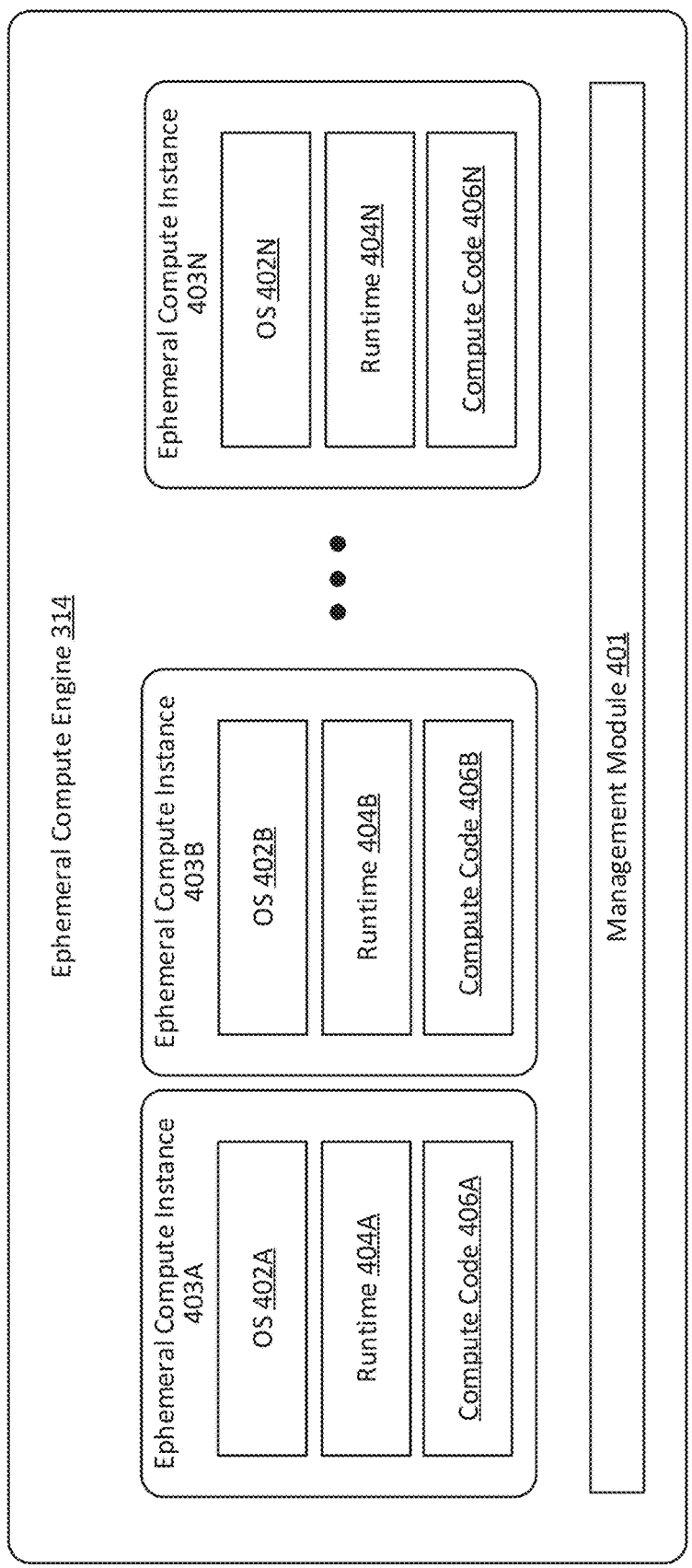
FIG. 4 illustrates an ephemeral compute service engine according to one example as described herein.

In some implementations, the ephemeral compute service 310 may include a scalable set of customer-facing servers (e.g., a set of ephemeral compute instances as further described in FIG. 4) that may provide the various types and amounts of cloud services based on the API specifications. That is, if many requests are granted simultaneously for an entity, the provided services may be scalable based on the granted requests. This then allows the entity to obtain and configure computing resources over a network, such as the Internet, to perform the desired ephemeral compute service based on the needs. Thus, the entity may quickly purchase or otherwise acquire a desired amount of computing resources without having to worry about acquiring physical machines.

In some implementations, once the account is verified and the resources are allocated, the request, e.g., the HTTPS POST request, may be then processed by the functions associated with the ephemeral compute service 310. In some implementations, in order to appropriately utilize the authorized ephemeral compute service 310, the ephemeral compute service 310 may include an event trigger handler 312, which may be configured to indicate a trigger to be used in invoking a specified authorization function. In some implementations, the specific trigger for triggering the ephemeral compute service 310 may be configured by a customer of the ephemeral compute service 310. This may include, for example, specifying one or more criteria of a received API call for triggering the ephemeral compute service 310. The criteria may be simple, such as by specifying a security policy to invoke a function for any API call associated with a customer or specifying a type of an API call associated with a customer, or complex, as may utilize any of a number of different criteria. In some implementations, the function of the ephemeral compute service may be owned by the third party or customer but the actual invocation may be performed by the resources of the virtual cloud service 304, which may invoke the function on behalf of the customer.

In some implementations, the ephemeral compute service 310 may authorize the invocation of an authorization function on the customer's behalf, using the parameters and context that are required for the invocation. For instance, during PCI information transmission, the ephemeral compute service 310 may communicate the persistent backend service 316 to query the data store 318 to retrieve the real account identifier or PAN associated with the token accompanying the request. If the real account is identified or PAN is verified, the event trigger handler 312 may then trigger the ephemeral compute service if the received request matches the triggering criteria. For instance, if the received request is an HTTPS POST request and the accompanying token confirmed that the request is from the customer associated with the assigned resource for the specified function (e.g., PCI information transmission), the ephemeral compute service with the specified function may be then triggered. The triggered ephemeral compute may be implemented by an ephemeral compute engine 314 (e.g., Amazon Lambda®, Azure Functions®, Google Cloud Functions®, etc.), as further described in detail in FIG. 4.

FIG. 4 illustrates an ephemeral compute service engine according to one example as described herein. As illustrated, the ephemeral compute service engine 314 may include a management module 401 and a plurality of ephemeral compute instances 403A, 403B, . . . , 403N (together or individually may be referred to as ephemeral compute instance 403) managed by the management module 401. Each instance 403 may further include an OS 402A, 402B, or 402N (together or individually may be referred to as "OS 402"), runtime 404A, 404, or 404N (together or individually may be referred to as "runtime 404"), and compute code 406A, 406B, or 406N (together or individually may be referred to as "compute code 406"). It should be understood that the illustration of the various components within ephemeral compute engine 314 is logical in nature and one or more of the components may be implemented by a single computing device or multiple computing devices. For example, the ephemeral compute instances 403A, 403B, . . . , 403N may be implemented on one or more physical computing devices in different various geographic regions. Similarly, each of the OS 402, the runtime 404, and the compute code 406 may be implemented across multiple physical computing devices or on a single physical computing device, among other such options. In some implementations, any of the components within the ephemeral compute engine 314 may communicate with other components of the ephemeral compute-based secure data transmission system 300 via the internet.

An entity may use an ephemeral compute instance 403 to execute compute code 406 thereon. For example, an entity may wish to run a piece of code in connection with the PCI information transmission that the entity has developed. One way of running the code would be to acquire ephemeral compute instances from service providers who provide infrastructure as a service, configure the ephemeral compute instances to suit the user's needs, and use the configured ephemeral compute instances to run the code. Alternatively, the entity may send a code execution request to the ephemeral compute engine 314. The ephemeral compute engine 314 may handle the acquisition and configuration of computing capacity based on the code execution request, and execute the code using the compute capacity. The ephemeral compute engine 314 may automatically scale up and down based on the volume of the ephemeral compute instances, thereby relieving the user from the burden of having to worry about over-utilization (e.g., acquiring too little computing resources and suffering performance issues) or under-utilization (e.g., acquiring more computing resources than necessary to run the codes, and thus overpaying).

The compute code 406 may refer to a program code (e.g., a program, function, routine, subroutine, thread, etc.) written in a specific program language. For example, the compute codes may be written in JavaScript, Python, and/or Ruby. When delivered to a computing source, such compute codes may be executed to achieve a specific task, for example, to transmit PCI information. In some implementations, the compute code 406 may be pre-loaded into an ephemeral compute instance 403, and thus is ready to be implemented in the ephemeral compute instance 403 once the request triggers the ephemeral compute service. The request may identify a previously uploaded compute code (e.g., using the API for uploading the code) by its name or its unique ID. In some implementations, the request may itself include the compute code (or the location thereof) and/or one or more arguments or context to be used for executing the compute code. For example, an entity may provide the compute code along with the request to execute the code. The ephemeral compute engine 314 may tune its code execution process based on when the compute code is available at the time the request is processed.

The management module 401 may receive the request to execute such compute code in response to, for example, HTTPS requests from an entity. Also, any information (e.g., headers and parameters) included in an HTTPS request may also be processed or utilized when executing the compute code. In some embodiments, the management module 401 may also receive the request to execute such compute code when an event is detected, such as an event that has been registered to trigger automatic request generation. For example, an entity may have registered the compute code and specified that whenever a particular event occurs (e.g., a new HTTPS POST request is uploaded), the request to execute the compute code is sent to the management module 401 to initiate the specified ephemeral compute.

As shown in FIG. 4, ephemeral compute instances 403 may also have operating systems (OS) and/or runtimes loaded thereon. In some implementations, the ephemeral compute instances may be used to serve different requests (e.g., balance transfer, purchasing, online shopping, etc.). In one implementation, all the ephemeral compute instances are configured in the same or substantially similar manner. In another implementation, the ephemeral compute instances may be configured differently to suit the needs of different users or entities. For example, the ephemeral compute instances may have different operating systems and different runtimes for suiting different needs or different entities. In some implementations, the same ephemeral compute instance cannot be used to service requests of any other user or entity once the ephemeral compute instance has been assigned to a particular user or entity. This provides security benefits by preventing possible co-mingling of user or entity resources.

In some implementations, after the compute code has been executed, the management module 401 may tear down the ephemeral compute instance used to execute the compute code to free up the resources it occupied to be used for other ephemeral compute instances. Alternatively, the management module 401 may keep the instance running to use it to service additional requests from the same entity. For example, if another request is associated with the same compute code that has already been loaded in the instance, the request may be assigned to the same instance, thereby eliminating the delay associated with creating a new instance and loading the compute code in the instance. The determination of whether to keep the instance running after the compute code is done executing may be based on a threshold time, the type of the user, and/or other operating conditions. For example, after a threshold time has passed without any activity (e.g., running off the compute code) based on the runtime data, the ephemeral compute instance is shut down (e.g., deleted, terminated, etc.), and resources allocated thereto are released.

Ephemeral compute instances 403 discussed above may be used for a variety of different purposes. Among these is the ability to utilize these ephemeral compute instances for transmitting PCI information to the payment service. For instance, an ephemeral compute instance 403 may include compute code 406 configured to transmit PCI information to the payment service 308. In some implementations, the compute code 406 may transmit the PCI information within an Identity and access management (IAM) framework, to ensure the ephemeral compute service operates with the least privilege. Identity and access management (IAM) is a framework of business processes, policies, and technologies that facilitate the management of electronic or digital identities. With an IAM framework in place, user access to critical information may be controlled. For example, within the IAM framework, the outbound network activity from the ephemeral compute instances may be restricted only to whitelisted services using virtual private cloud (VPC) endpoints. In some implementations, the virtual cloud service 304 may whitelist the outbound IP addresses to which the ephemeral compute service connects. This then ensures that no malicious source can request the PCI information from the ephemeral compute service 310. For instance, the IP address for the payment service 308 may be whitelisted, so that the outbound PCI information is transmitted to the payment service 308 for further processing, but not to other malicious sources.

Payment service 308 may include data processing subsystems, networks, and operations used to support and deliver transaction authorization services, and certain other services such as exception file services, transaction scoring services, and clearing and settlement services. For instance, upon receiving the PCI information from the ephemeral compute service 310, the PCI information may be parsed, and the information in the authorization request may be verified. In some implementations, some or all of the PCI information may be used for verification and processing. In some implementations, certain non-PCI information associated with the transaction request may be also transmitted by the virtual cloud service 304 (e.g., through the persistent backend service 316) to the payment service. The non-PCI information may be also parsed for verification and processing. For instance, the total value of the transaction, the transaction time, and some other transaction information may be included in the non-PCI information, which may be transmitted through the persistent backend service 316. This non-PCI information may be combined with the PCI information transmitted through the ephemeral compute service 310 in the transaction verification process by the payment service 308.

In some implementations, after the verification, the payment service 308 may also transmit an authorization response message to the client application server 302 coupled to a client device associated with the entity. The authorization response message may contain non-PCI information and thus may also be transmitted through the persistent backend service 316. The authorization response results, which may include transaction data for the transaction may be displayed by an access device (e.g., a POS 105 or a customer device 103), or be printed out on a physical receipt. This then completes the transaction process.

As can be seen, by using the ephemeral compute service, the payment card information is merely communicated within the virtual cloud service 304 protected by the firewall, but is not stored in the disclosed ephemeral compute-based secure data transmission system 300. In addition, certain other security strategies, including IFrame, authorization token, least privilege, etc., are also implemented in the disclosed ephemeral compute-based secure data transmission system 300. Accordingly, the security of transmitting the PCI information is greatly improved by the disclosed system. In addition, since the ephemeral compute service can use virtual cloud service provided by the third-party providers, the configuration and maintaining the physical servers for supporting the PCI standards may be avoided, thereby greatly saving the resources required for businesses in the payment card processing. The specific process for transmitting sensitive information using the disclosed ephemeral compute-based secure data transmission system 300 is further described below in FIG. 5.

Figure 5:
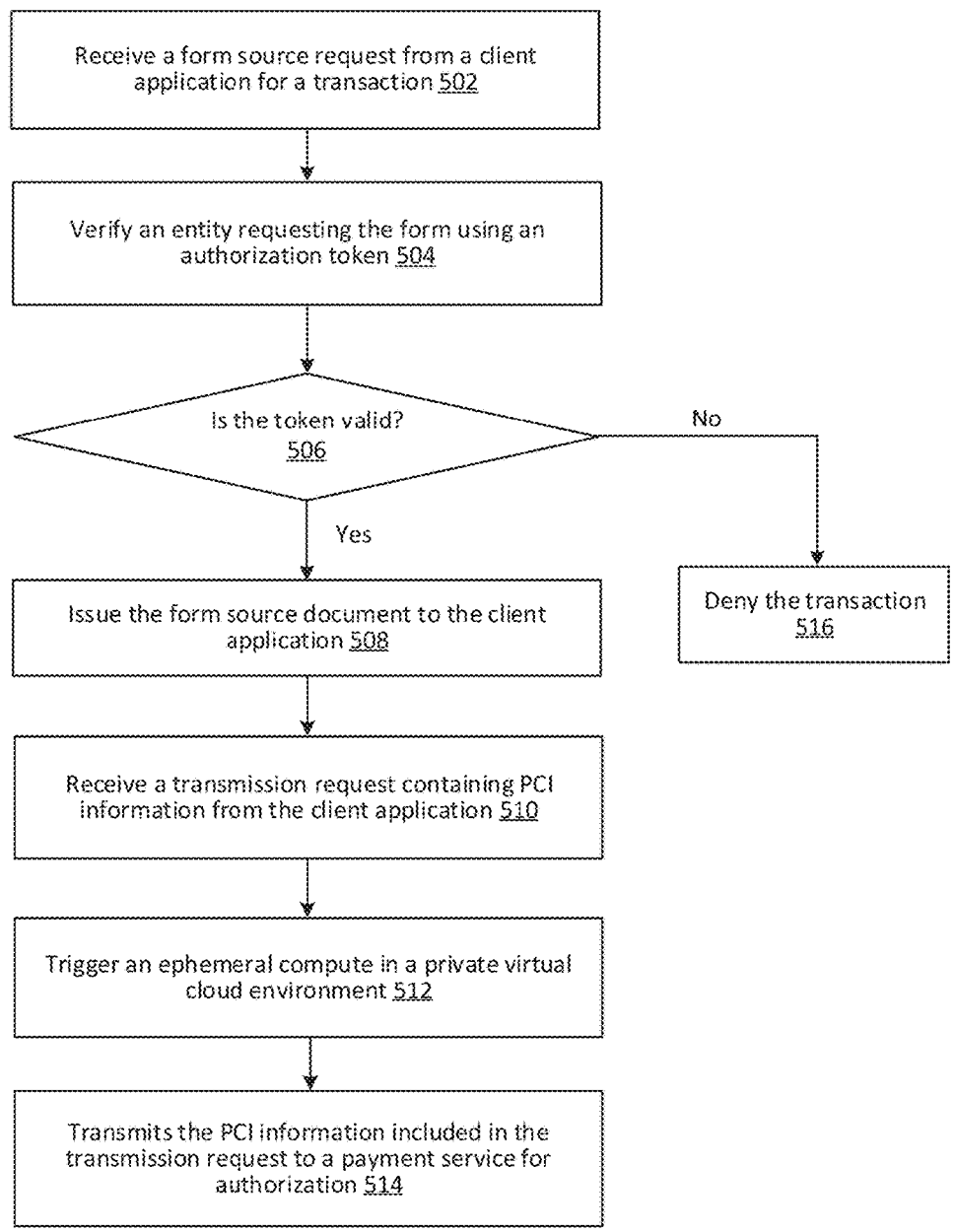
FIG. 5 illustrates a flow chart of a method for transmitting PCI information using ephemeral compute service according to one example as described herein.

FIG. 5 illustrates a flow chart of a method 500 for transmitting PCI information using ephemeral compute service according to one example as described herein. In some implementations, method 500 may be performed by various components of the ephemeral compute-based secure data transmission system 300, e.g., the ephemeral compute service 310 and persistent backend service 316. In some implementations, method 500 may include steps 502-516. It is to be appreciated that some of the steps may be optional. Further, some of the steps may be performed simultaneously, or in a different order than that shown in FIG. 5.

In step 502, a form source request for a transaction is received from a client application. For instance, at the beginning of a transaction, a client application may request a form for capturing the payment card information. The client application may be associated with a POS 105 or customer device 103, each of which may have an associated authorization token. When submitting the request for the form resource document for capturing the payment card information, the authorization token may be submitted simultaneously.

In step 504, the entity requesting the form is verified using the authorization token. For instance, the received authorization token may be verified by checking whether the mapping account identifier matches the entity submitting the form source request. For instance, if the form source request is submitted by a POS 105. The authorization token submitted with the request may be parsed to obtain the corresponding account identifier. The parsed account identifier may be then compared with the account information associated with the POS 105 submitted together with the request.

In step 506, it is determined whether the token is valid. For instance, by comparing the account identifier parsed from the authorization token with the account information for the entity submitting the request, it can be determined whether the authorization token is valid or not. If the parsed account identifier matches the account information, the authorization token is invalid. The process is then proceeded to step 508 to issue the form source document. However, if the parsed account identifier does not match the account information, the process may proceed to step 516 to deny the transaction, so as to terminate the transaction. This may prevent malicious transactions.

In step 508, the form source document is issued to the client application associated with the entity requesting the form. The form source document may include certain areas for capturing the payment card information. In some implementations, the form source document may be rendered to the entity in an IFrame format, to offer an extra layer of protection in securing the customer's sensitive data, such as payment card number, customer name, etc. After the client application receives the form source document, the client information may capture the payment card information and certain other PCI and non-PCI information during the transaction.

In step 510, a PCI information transmission request for transmitting the PCI information to a payment service may be received. The request may be received from the client application through a safety gateway. For instance, the request may be received as an HTTPS POST request.

In step 512, an ephemeral compute may be triggered based on the received HTTPS POST request. For instance, an ephemeral compute instance may be invoked or instantiated in an ephemeral compute service engine located within a private virtual cloud environment protected by the firewall. The ephemeral computer instance may be invoked once the HTTPS POST request is received. That is, the HTTPS POST request is a triggering event that can invoke the ephemeral compute. The triggered ephemeral compute instance may include compute code for implement the function associated with the request, e.g., for transmitting PCI information to the payment service.

In step 514, the PCI information included in the HTTPS post request is then transmitted to the payment service by the invoked ephemeral compute instance. The transmitted PCI information may be parsed to obtain the necessary information in authorizing the request. In some implementations, certain non-PCI information may be also transmitted from the client application to the payment service. The transmission of non-PCI information may be implemented through a persistent backend service that is also located within the private virtual cloud environment protected by the firewall. The PCI information with or without non-PCI information may be used to determine whether to authorize the transaction. Once authorized, a response message may be generated and returned back to the client application, to either grant or deny the transaction process, thereby completing the transaction.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some examples, a service may be software that resides in the memory of a client device and/or one or more servers of a content management system and perform one or more functions when a processor executes the software associated with the service. In some examples, a service is a program or a collection of programs that carry out a specific function. In some examples, a service may be considered a server. The memory may be a non-transitory or transitory computer-readable medium.

In some examples the computer-readable storage devices, mediums, and memories may include a cable or wireless signal containing a bit stream and the like. However, when mentioned, transitory computer-readable storage media are media such as energy, carrier signals, electromagnetic waves, and signals per se.

Methods according to the above-described examples may be implemented using computer-executable instructions that are stored or otherwise available from computer-readable media. Such instructions may comprise, for example, instructions and data which cause or otherwise configure a general-purpose computer, special purpose computer, or special purpose processing device to perform a certain function or group of functions. Portions of computer resources used may be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures may comprise hardware, firmware and/or software, and may take any of a variety of form factors. Typical examples of such form factors include servers, laptops, smartphones, small form factor personal computers, personal digital assistants, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Although some subject matter may have been described in language specific to examples of structural features and/or method steps, it is to be understood that the subject matter defined in the appended claims is not necessarily limited to these described features or acts. For example, such functionality may be distributed differently or performed in components other than those identified herein. Rather, the described features and steps are disclosed as examples of components of systems and methods within the scope of the appended claims.

Having now fully set forth examples and certain modifications of the concept underlying the present invention, various other examples as well as certain variations and modifications of the examples shown and described herein will obviously occur to those skilled in the art upon becoming familiar with said underlying concept.

What is claimed is:

1. A method for payment card processing, the method comprising:
   receiving, from a client application installed on a client application server, a form source request submitted by an entity accessing the client application server for a form for capturing sensitive information of a payment card;
   verifying the entity requesting the form using an authorization token;
   responsive to the entity being valid, issuing, by one or more processors of a cloud server, a form source document to the client application installed on the client application server;
   capturing, at the client application server, the sensitive payment information of the payment card using the form source document;
   receiving, by the one or more processors of the cloud server, a request submitted by the entity from the client application installed on the client application server, the request having compute code that is executed to transmit the sensitive information associated with the payment card to a payment service during a transaction process;
   generating, by the one or more processors of the cloud server, an ephemeral compute instance to preload the compute code identified in the request to the cloud server and include the compute code identified in the request and computer resources allocated to process the request in the ephemeral compute instance;
   triggering, by the one or more processors of the cloud server, the ephemeral compute instance to execute the compute code in the ephemeral compute instance for transmitting the sensitive information associated with the payment card to the payment service;
   transmitting, by the one or more processors of the cloud server, the sensitive information associated with the payment card from the client application server to the payment service; and
   turning down, by the one or more processors of the cloud server, the ephemeral compute instance and releasing the computer resources allocated to the ephemeral compute instance once the sensitive information associated with the payment card is transmitted to the payment service for determining whether to authorize the transaction process.

2. The method of claim 1, wherein the form source document is rendered in the client application in an inline frame (IFrame).

3. The method of claim 2, further comprising preventing access of data with the IFrame while allowing the form source document to safely capture the sensitive information associated with the payment card.

4. The method of claim 3, wherein receiving the request comprises:
   receiving the IFrame with the captured sensitive information via a hypertext transfer protocol secure (HTTPS) post request.

5. The method of claim 1, further comprising:
   determining whether to keep the ephemeral compute instance after the compute code is executed; and
   responsive to determining a second request from the entity is associated with the compute code included in the ephemeral compute instance, assigning the ephemeral compute instance to the second request to avoid delay caused by creating a new compute instance and loading the compute code in the new compute instance.

6. The method of claim 5, wherein determining whether to keep the ephemeral compute instance is also based on a type of the entity.

7. The method of claim 1, wherein outbound network activity associated with the ephemeral compute instance is restricted to whitelisted services.

8. The method of claim 1, further comprising:
   transmitting, by a persistent backend service, non-sensitive information associated with the transaction process to the payment service.

9. The method of claim 8, wherein the sensitive information transmitted through the ephemeral compute instance and the non-sensitive information transmitted by the persistent backend service are combined in determining whether to authorize a transaction associated with the transaction process.

10. A system for payment card processing, the system comprising:
    a processor of a cloud server;
    a client application server; and
    a memory, coupled to the processor and configured to store executable instructions that, when executed by the processor, cause the processor to:
       receive, from the client application installed on the client application server, a form source request submitted by an entity accessing the client application server for a form for capturing sensitive information of a payment card;
       verify the entity requesting the form using an authorization token;
       responsive to the entity being valid, issue a form source document, by the cloud server, to the client application installed on the client application server;
       capture, at the client application server, the sensitive payment information of the payment card using the form source document;
       receive, at the cloud server, a request submitted by the entity from the client application installed on the client application server, the request comprising compute code that is executed for transmitting the sensitive information associated with the payment card to a payment service during a transaction process;
       generate, by the cloud server, an ephemeral compute instance to preload the compute code identified in the request to the cloud server and include the compute code identified in the request and computer resources allocated to process the request in the ephemeral compute instance;

trigger, by the cloud server, the ephemeral compute instance to execute the compute code in the ephemeral compute instance for transmitting the sensitive information associated with the payment card to the payment service;

transmit, by the cloud server, the sensitive information associated with the payment card from the client application server to the payment service; and turn down, by the cloud server, the ephemeral compute instance and release the computer resources allocated to the ephemeral compute instance once the sensitive information associated with the payment card is transmitted to the payment service for determining whether to authorize the transaction process.

11. The system of claim 10, wherein the form source document is rendered in the client application in an inline frame (IFrame).

12. The system of claim 11, wherein the instructions further cause the processor to prevent access of data with the IFrame while allowing the form source document to safely capture the sensitive information associated with the payment card.

13. The system of claim 12, wherein, to receive the request, the instructions further cause the processor to:
receive the IFrame with the captured sensitive information via a hypertext transfer protocol secure (HTTPS) post request.

14. The system of claim 10, wherein the instructions further cause the processor to:
determine whether to keep the ephemeral compute instance after the compute code is executed; and
responsive to determining a second request is associated with the compute code included in the ephemeral compute instance, assign the ephemeral compute instance to the second request to avoid delay caused by creating a new compute instance and loading the compute code in the new compute instance.

15. The system of claim 14, wherein determining whether to keep the ephemeral compute instance is also based on one or more of a threshold time and a type of the entity.

16. The system of claim 10, wherein outbound network activity associated with the ephemeral compute instance is restricted to whitelisted services.

17. A computer program product for payment card processing, the computer program product comprising a non-transitory computer-readable medium having computer readable program code stored thereon, the computer read program code configured to:

receive, from a client application installed on a client application server, a form source request submitted by an entity accessing the client application server for a form for capturing sensitive information of a payment card;

verify the entity requesting the form using an authorization token;

responsive to the entity being valid, issue a form source document, by a cloud server, to the client application installed on the client application server;

capture, at the client application server, the sensitive payment information of the payment card using the form source document;

receive, by the cloud server, a request submitted by the entity from the client application installed on the client application server, the request comprising compute code that is executed for transmitting the sensitive information associated with a payment card to a payment service;

generate and trigger, by the cloud server, the ephemeral compute instance to preload the compute code identified in the request to the cloud server and include the compute code identified in the request and computer resources allocated to process the request in the ephemeral compute instance;

transmit, by the cloud server, the sensitive information associated with the payment card from the client application server to the payment service; and shut down, by the cloud server, the ephemeral compute instance and release the computer resources allocated to the ephemeral compute instance after transmission of the sensitive information to the payment service; and cause the payment service to authorize a transaction based on the sensitive information transmitted by the ephemeral compute instance.

18. The computer program product of claim 17, wherein the computer read program code is further configured to:
transmit non-sensitive information collected during the transaction through a persistent backend service, wherein the non-sensitive information is combined with the sensitive information in authorizing the transaction.

* * * * *